United States Patent Office 3,222,367
Patented Dec. 7, 1965

1

3,222,367
1-ACYL SUBSTITUTED QUINOLIZINES AND
PROCESS FOR THEIR PRODUCTION
Richard E. Brown, Hanover, and Robert I. Meltzer,
Rockaway, N.J., assignors to Warner-Lambert Pharmaceutical Company, Morris Plains, N.J., a corporation of Delaware
No Drawing. Filed July 16, 1963, Ser. No. 295,540
4 Claims. (Cl. 260—289)

This invention relates to certain substituted quinolizines. More particularly, this invention relates to 1-acyl substituted quinolizines of the formula:

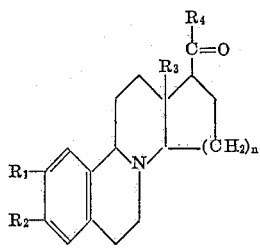

wherein $R_1$ and $R_2$ each represents hydrogen, hydroxy, or lower alkoxy such as methoxy, ethoxy or propoxy; $R_3$ represents hydrogen or lower alkyl such as methyl, ethyl or propyl, $R_4$ represents lower alkyl such as methyl, ethyl, propyl and butyl, and $n$ is an integer of 1 or 2, and to the non-toxic pharmaceutically acceptable acid addition salts thereof. This invention also includes within its scope a novel process for the production of these 1-acyl substituted quinolizines.

The numbering of the compounds of this invention when $n$ is 2 is as follows:

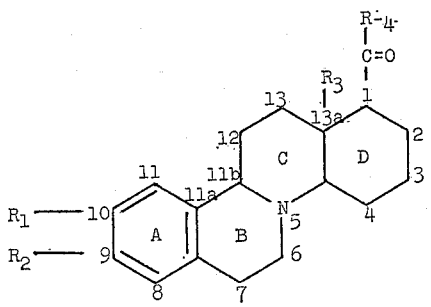

and when $n$ is 1 the numbering is as follows:

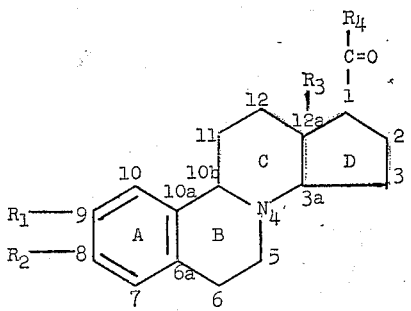

Exemplary of the novel 1-acyl substituted quinolizines are:

1,2,3,3a,5,6,10b,11,12,12a-decahydro-1-acetyl-8,9-dimethoxy-12a-methyl-benz[a]cyclopenta[f]quinolizine,
1,2,3,3a,5,6,10b,11,12,12a-decahydro-1-acetyl-8-methoxy-12a-methyl-benz[a]cyclopenta[f]quinolizine,

2

1,2,3,3a,5,6,10b,11,12,12a-decahydro-1-propionyl-8-methoxy-12a-methyl-benz[a]cyclopenta[f]quinolizine,
1,2,3,3a,5,6,10b,11,12,12a-decahydro-1-propionyl-8-hydroxy-12a-methyl-benz[a]cyclopenta[f]quinolizine, and the like.

These new and novel compounds exhibit interesting pharmacological activity and are useful in the treatment of shock and circulatory collapse. They also possess hormonal activity. In addition, they are valuable intermediates in the production of other substituted quinolizines.

In accordance with this invention, these novel 1-acyl substituted quinolizines may be produced by treating 1-carboxy substituted quinolizine with an organo lithium compound of the formula $R_4Li$. The reaction may be represented by the following equation:

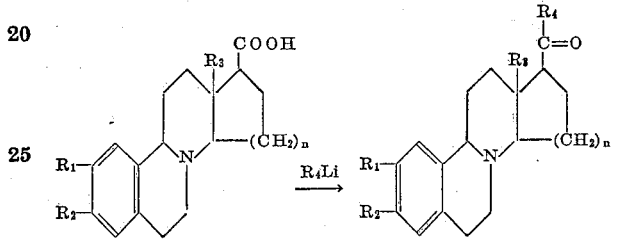

In the above equation, the symbols $R_1$, $R_2$, $R_3$, $R_4$ and $n$ have the same meaning as defined.

The preparation of the material used in this reaction is described and claimed in our co-pending application, Serial No. 248,872, filed January 2, 1963.

Generally, the above-described reaction is carried out by treating a suspension of the starting material in an anhydrous inert solvent with the selected organo lithium compound. The resulting mixture is then stirred at ambient temperature, such as 20 to 30° C. for a period of about 120 minutes, after which the mixture is hydrolysed with water. The desired reaction product can be readily recovered from the aqueous layer by extracting with solvents, such as ethyl acetate. As suitable solvents for the reaction, there may be mentioned for example, dry tetrahydrofuran, petroleum ether, diethyl ether and the like.

It is to be understood that the new and novel compounds of this invention may be used as the free base or may be converted into the corresponding nontoxic pharmaceutically acceptable acid addition salts. Exemplary of nontoxic acid addition salts are those formed with maleic, fumaric, benzoic, ascorbic, succinic, bismethylensalicyclic, methylsulfonic, ethanedisulfonic, acetic, propionic, tartaric, salicylic, citric, gluconic, lactic, malic, mandelic, cinnamic, citraconic, stearic, palmitic, icaconic, glycolic, benzenesulfonic, hydrochloric, hydrobromic, sulfuric, sulfamic, phosphoric, and nitric acids. The acid addition salts may be prepared in the conventional manner, for example, by treating a solution or suspension of the free base in an organic solvent with the desired acid and then recovering the salt which forms by crystallization techniques.

In order to further illustrate this invention, the following examples are given. All temperatures are given in the centigrade scale.

EXAMPLE 1

*Preparation of 1,2,3,3a,5,6,10b,11,12,12a-decahydro-1-acetyl-8,9-dimethoxy - 12a-methylbenz[a]cyclopenta[f] quinolizine*

A suspension of 2.0 g. of 1,2,3,3a,5,6,10b,11,12,12a,-decahydro - 1 - carboxy - 8,9 - dimethoxy - 12a - methylbenz[a]cyclopenta[f]quinolizine hydrochloride in 100 ml. of dry tetrahydrofuran is treated with a solution of 25 millimoles of methyl lithium in 25 ml. of anhydrous ether dropwise over a period of 30 minutes. The mixture is then stirred at room temperature for 2 hours. There is then added 100 ml. of water, and the tetrahydrofuran is removed by distillation. The aqueous solution is extracted with ethyl acetate. The ethyl acetate solution is dried over sodium sulfate and the ethyl acetate is removed by distillation. The residue is taken up in ethanol and cooled slowly to give 1,2,3,3a,5,6,10b,11,12,12a - decahydro - 1 - acetyl - 8,9 - dimethoxy - 12a-methylbenz[a]cyclopenta[f]quinolizine as a white solid which after recrystallization from ethanol has a M.P. of 124–6°.

EXAMPLE 2

*Preparation of 1,2,3,3a,5,6,10b,11,12,12a-decahydro-1-acetyl - 8 - methoxy - 12a - methylbenz[a]cyclopenta-[f]quinolizine*

In the same way as described in Example 1, 2.0 g. of 1,2,3,3a,5,6,10b,11,12,12a - decahydro - 1 - carboxy - 8- methoxy - 12a - methylbenz[a]cyclopenta[f]quinolizine hydrochloride on reaction with methyl lithium gives 1,2,3,3a,5,6,10b,11,12,12a - decahydro - 1 - acetyl - 8- methoxy - 12a - methylbenz[a]cyclopenta[f]quinolizine as white crystals, M.P. 124–5° after recrystallization from aqueous-ethanol.

EXAMPLE 3

*Preparation of 1,2,3,3a,5,6,10b,11,12,12a-decahydro-1-valeryl - 8 - methoxy - 12a - methyl - benz[a]cyclopenta [f]quinolizine hydrobromide*

In the same way as described in Example 1, 2.0 g. of 1,2,3,3a,5,6,10b,11,12,12a - decahydro - 1 - carboxy - 8- methoxy - 12a - methylbenz[a]cyclopenta[f]quinolizine hydrochloride in 100 ml. of dry tetrahydrofuran is treated with a solution of 25 millimoles of butyllithium in heptane to give 1,2,3,3a,5,6,10b,11,12,12a-decahydro-1-valeryl - 8 - methoxy - 12a - methylbenz[a]cyclopenta[f] quinolizine which gives a hydrobromide as white crystals, M.P. 206–8.

It is to be understood that the foregoing detailed description is given merely by way of illustration and that many variations may be made therein without departing from the spirit of our invention.

Having described our invention, what we desire to secure by Letters Patent is:

1. A member selected from the group consisting of compounds of the formula:

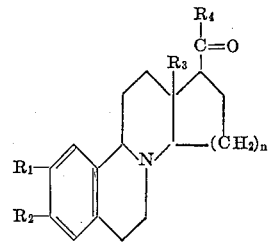

wherein $R_1$ and $R_2$ is each a member selected from the group consisting of hydrogen, hydroxy, and lower alkoxy; $R_3$ is a member selected from the group consisting of hydrogen and lower alkyl; $R_4$ is lower alkyl and $n$ is an integer from 1 to 2, and the nontoxic pharmaceutically acceptable acid addition salts thereof.

2. 1,2,3,3a,5,6,10b,11,12,12a - decahydro - 1 - acetyl-8,9 - dimethoxy - 12a - methyl - benz[a]cyclopenta[f] quinolizine.

3. 1,2,3,3a,5,6,10b,11,12,12a - decahydro - 1 - acetyl - 8- methoxy - 12a - methyl - benz[a]cyclopenta[f]quinolizine.

4. 1,2,3,3a,5,6,10b,11,12,12a - decahydro - 1 - valeryl-8 - methoxy - 12a - methyl - benz[a]cyclopenta[f]quinolizine hydrobromide.

References Cited by the Examiner

Fieser et al.: "Advanced Organic Chemistry," Reinhold, 1961, pp. 400–401 relied on.

NICHOLAS S. RIZZO, *Primary Examiner.*

DONALD G. DAUS, *Assistant Examiner.*